US 7,118,319 B1

(12) United States Patent
Debrunner et al.

(10) Patent No.: US 7,118,319 B1
(45) Date of Patent: Oct. 10, 2006

(54) BULK CLOSURE DISPENSING SYSTEM

(75) Inventors: Kurt Debrunner, Richmond, VA (US); Patrick J. Nash, Midlothian, VA (US)

(73) Assignee: Crown Cork & Seal Technologies Corporation, Alsip, IL (US)

( * ) Notice: Subject to any disclaimer, the term of this patent is extended or adjusted under 35 U.S.C. 154(b) by 0 days.

(21) Appl. No.: 10/262,803

(22) Filed: Oct. 2, 2002

Related U.S. Application Data (60) Provisional application No. 60/326,845, filed on Oct. 2, 2001.

(51) Int. Cl.
*B65B 21/02* (2006.01)

(52) U.S. Cl. .................. 414/414; 414/421; 414/425
(58) Field of Classification Search .......... 414/421, 414/414, 425
See application file for complete search history.

(56) References Cited

U.S. PATENT DOCUMENTS

| | | | | |
|---|---|---|---|---|
| 2,738,085 A | * | 3/1956 | David | 414/421 |
| 3,754,671 A | * | 8/1973 | Walda | 414/404 |
| 3,899,095 A | * | 8/1975 | Wiese | 414/414 |
| 3,978,999 A | * | 9/1976 | Ryder | 414/421 |
| 4,536,033 A | * | 8/1985 | Allen | 298/2 |
| 5,042,538 A | | 8/1991 | Wiese | 141/93 |
| 5,095,954 A | | 3/1992 | Wiese | 141/1 |
| 5,096,099 A | | 3/1992 | Wiese | 222/561 |
| 5,246,041 A | | 9/1993 | Wiese | 141/1 |
| 5,302,073 A | * | 4/1994 | Riemersma et al. | 414/421 |
| 5,690,450 A | | 11/1997 | Miller et al. | 406/39 |
| 5,944,470 A | | 8/1999 | Bonerb | 414/421 |
| 6,298,994 B1 | * | 10/2001 | Debrunner et al. | 206/600 |
| 6,379,097 B1 | * | 4/2002 | Vondenhuevel et al. | 414/414 |
| 6,394,736 B1 | | 5/2002 | Derby et al. | 414/583 |
| 6,769,857 B1 | * | 8/2004 | Nyhof | 414/421 |

OTHER PUBLICATIONS

Showing images of feeding apparatus that Applicant believes may constitute prior art, "Emptying of Octabins or Wire Cage Containers single or multiple In–Line Systems", http://www.eckel–sohn.de/eckel–sohn_eng/index.html, Herzlich Willkommen bei Eckel & Sohn, 1 page.

* cited by examiner

*Primary Examiner*—Douglas A. Hess
(74) *Attorney, Agent, or Firm*—Woodcock Washburn LLP (57) ABSTRACT

A system and method for dispensing bulk closures from a removable and transportable bin. The system has a pivotable frame for receiving and tilting the bin and a movable gate including a closed position in which the gate covers the bin opening and an open position in which the gate is spaced apart from the opening to enable closures to flow therethrough. The gate is moveable from the open position to the closed position while closures are within the bin, thereby enabling dispensing of less than all of the closures from the bin. The system may include an access cover, hopper, slide gates, and access shield. The method may include employing the system and unloading only a portion of a particular bin.

41 Claims, 8 Drawing Sheets

BULK CLOSURE DISPENSING SYSTEM

This application claims the benefit of U.S. Provisional Application No. 60/326,845, filed Oct. 2, 2001.

BACKGROUND

This invention relates to handling bulk materials, and more particularly, to apparatus and methods for handling and dispensing closures from bulk containers.

Tens of billions of closures for containers are sold in the U.S. per year, including those for carbonated beverages, hot-filled food and drink, sauces, jellies, and the like, and those for non-food or drink products. The number of such containers and closures is expected to increase as plastic containers replace those formed of other materials. Handling such vast quantities of containers and closures facilitate material handling innovation.

Typically, bins containing closures are shipped from the closure manufacturer to a user, such as a bottler or like filler. The process for installing the closures on the particular containers, often referred to as capping, conventionally is a high-speed, automated process. Prior art methods and apparatus lack the capability to unload partial quantities of bins and often require complete emptying of the bin before another bin can be unloaded, among other drawbacks.

SUMMARY OF THE INVENTION

A bulk closure dispensing system is provided that comprises a bin for housing plural closures, a pivotable frame for receiving and tilting the bin, and a movable gate. The bin includes an opening formed in a lower portion thereof and a cover for moveably covering the bin opening. The gate has a closed position in which the gate essentially covers the bin opening and an open position in which the gate is spaced apart from the opening to enable closures to flow therethrough. The gate is moveable from the open position to the closed position while closures are within the bin, thereby enabling dispensing of less than all of the closures from the bin.

The bin cover may be a pivotable flap that is pivotable between a flap-closed position in which the flap substantially covers the bin opening and a flap-open position in which the flap is pivoted away from the bin opening to enable closures to flow therethrough. The gate may be supported by the frame and slideable thereon. A hopper may be disposed below the bin to receive the closures. The gate is moveable from the open position to the closed position while closures are flowing from the bin into the hopper, whereby the flow of closures is interrupted. Further, the gate is moveable from the open position to the closed position while closures are statically piled in the hopper such that the closures fill the bin opening.

An access shield coupled to an end of the frame opposite the pivot may be provided. The access shield is movable with the frame and extends downwardly therefrom. The access shield prevents a pinch-point between the frame and the support structure. Pins may be inserted through the support frame and through the access shield, thereby preventing movement of the frame relative to the support structure.

According to another aspect of the present invention, a method of handling closures is provided. The method comprises the steps of: a) providing plural closures in a portable bin that has an opening in a sidewall thereof and a moveable cover substantially covering the bin opening while the cover is in a cover-closed position; b) disposing the bin on a frame of a dispensing apparatus that includes a gate that is moveable between a closed position in which the gate essentially covers the bin opening and an open position in which the gate is spaced apart from the opening to enable closures to flow therethrough, the gate being moveable from the open position to the closed position while closures are within the bin; and c) pivoting the frame, thereby tilting the bin to encourage closures to flow outward from the bin through the bin opening into a hopper while the cover is in a cover-open position and the gate is in a gate-open position.

The step of actuating the gate to its gate-closed position may be performed while a portion of the closures are disposed in the bin, thereby preventing closures from further flowing from the bin. Additionally, the step of closing the cover includes first moving the gate from the gate-open position to the gate-closed position while the flap is in a position away from the bin opening, pivoting the flap over the gate in the gate-closed position, and retracting the gate to the gate-open position, thereby leaving the flap covering the bin opening. Portions of the closures in the bin may be unloaded in discontinuous stages.

According to another aspect of the present invention, a bulk closure dispensing apparatus is provided for unloading closures from a bin through an opening therein. The apparatus comprises a pivotable frame for receiving and tilting the bin, a gate coupled to the frame, and a hopper disposed below the gate. The bin includes an open front portion which is capable of receiving closures therethrough. The gate is slideable on the frame between a closed position and an open position, whereby the gate in the gate-closed position essentially covers the frame open front portion and the gate in the gate-open position is spaced apart from the frame open front portion to enable closures to flow therethrough. The gate is capable of being slideable between the gate-open and the gate-closed position during any phase of the closure unloading process.

DESCRIPTION OF PREFERRED EMBODIMENTS

A bulk closure dispensing system 10 includes a bin 12 and a dispensing apparatus 14, as generally shown in FIGS. 1 through 5. Bin 12 is capable of containing plural plastic closures (not shown), such as threaded closures for affixing to plastic beverage containers. Bin 12 is removable and transportable relative to apparatus 14. Bin 12 preferably is as described in U.S. Pat. No. 6,298,994, entitled "Hexagonal Shipping Container System," which is incorporated by reference herein in its entirety.

Figure 6:
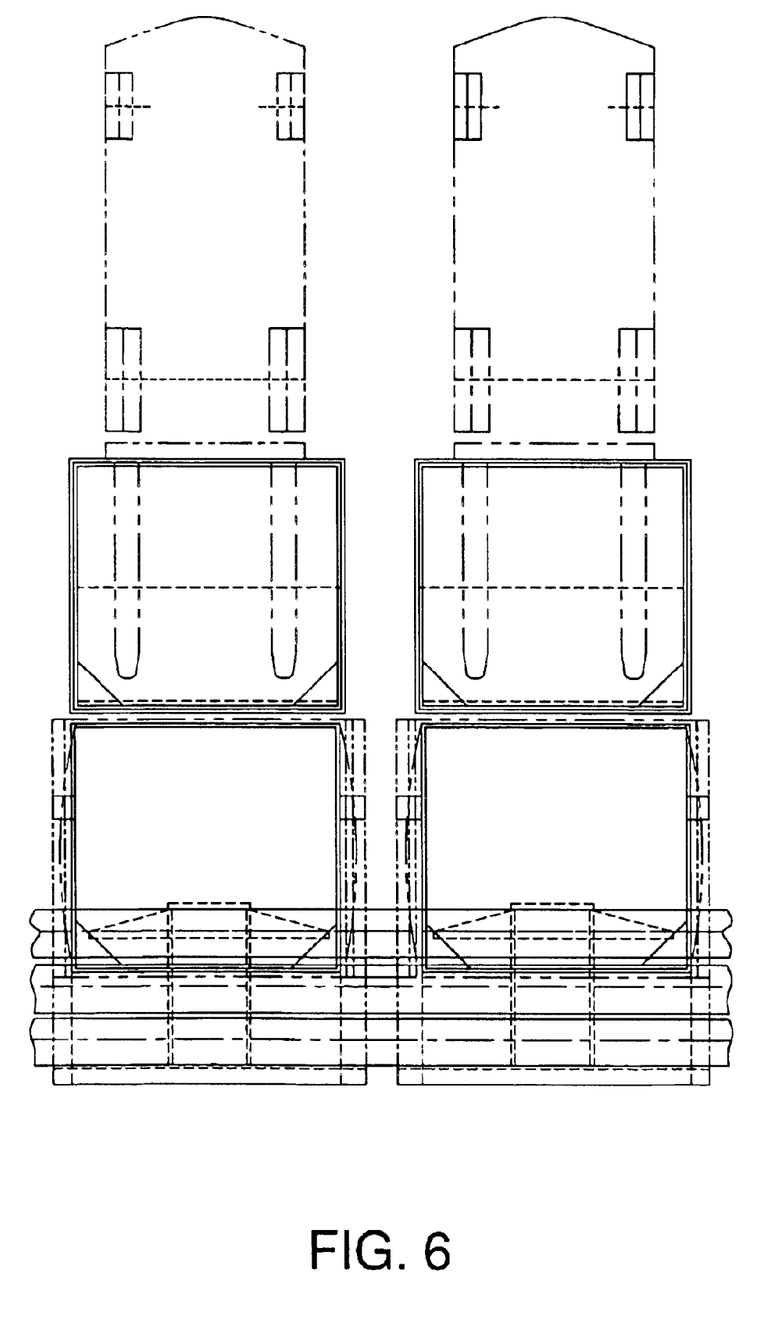
FIG. 6 is a top view of the system embodiment shown in FIG. 1.
Figure 7:
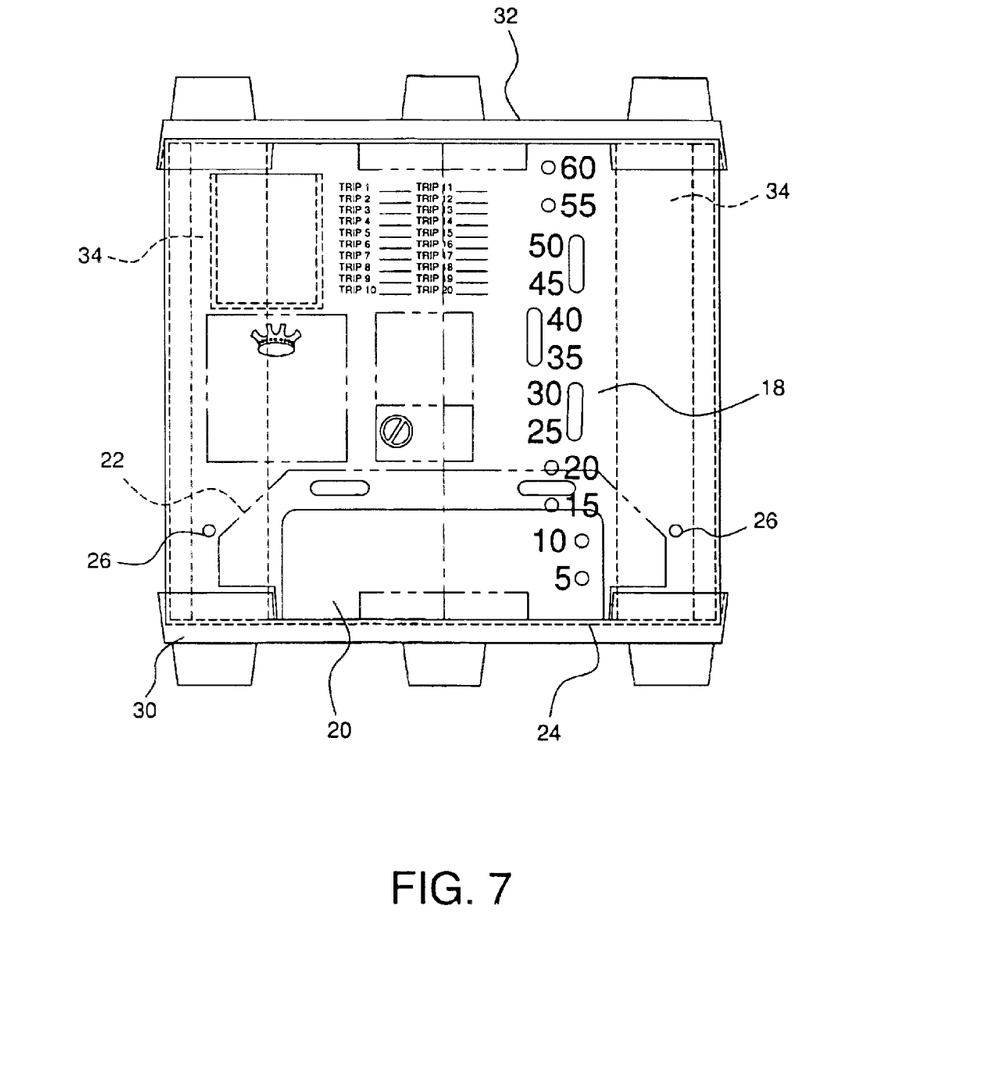
FIG. 7 is an enlarged front elevation view of a bin.

As shown in FIG. 7, bin 12 has sidewalls, including a front sidewall 18, a bottom 30, and a top 32. Bottom 30 is configured to be supported and transported by a forklift, as generally shown in FIG. 6. Sidewall 18 includes an opening 20 formed in a lower portion thereof and apertures 26 on opposing sides of opening 20. Bin 12 also includes a cover, such as flap 22 that is hinged to front sidewall 18 at flap hinge 24. Preferably, bin 12 includes angled portions 34.

As shown best shown in FIGS. 1 through 6, dispensing apparatus 14 includes supports 36, a frame 38, side barriers 40, and a gate 42. Depending on the particular parameters of the configuration, apparatus 14 may also include a hopper 44 and an access cover assembly 46.

Figure 1:
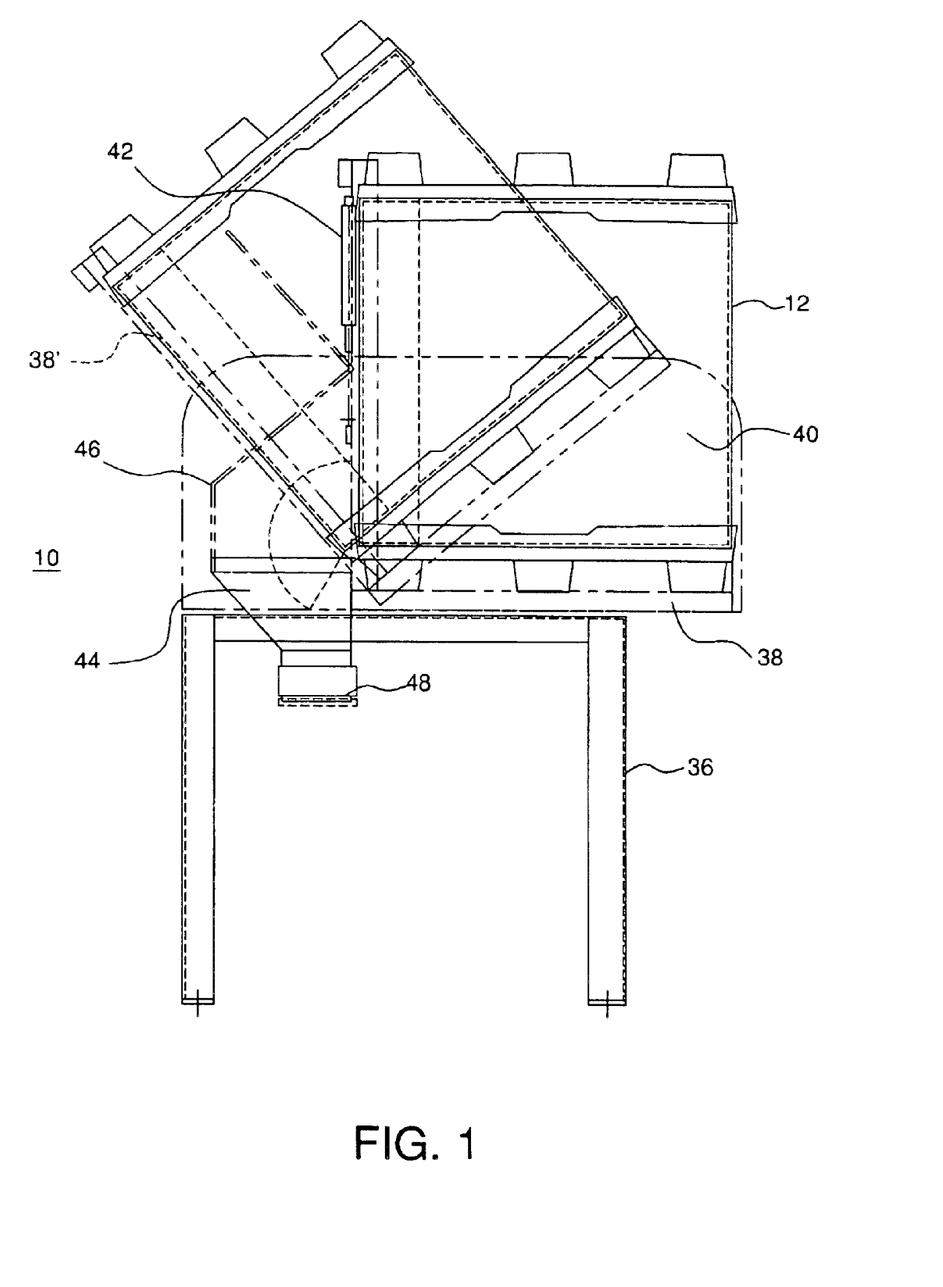
FIG. 1 is a side elevation view of an embodiment of the system according to an aspect of the present invention.
Figure 2:
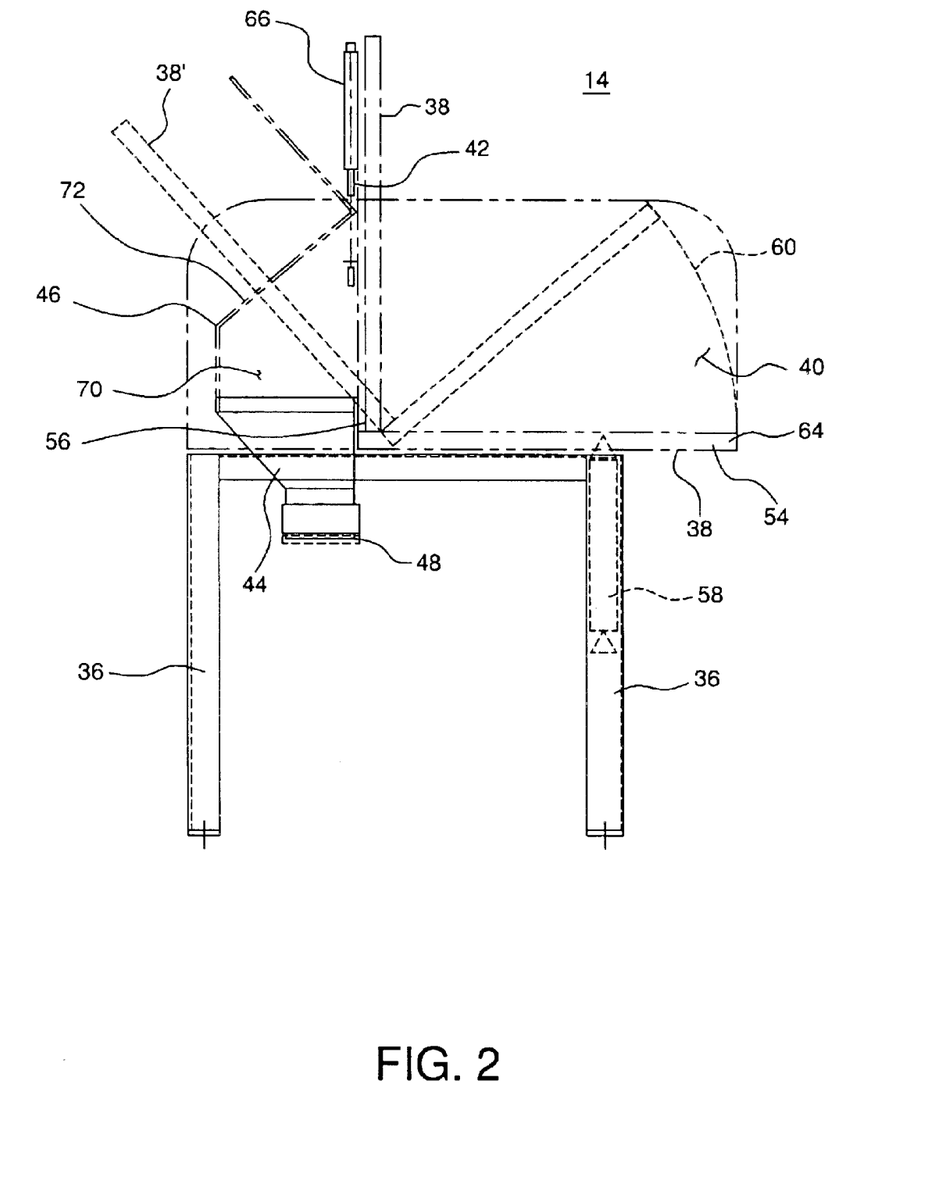
FIG. 2 is a side elevation view of an embodiment of the apparatus according to an aspect of the present invention.
Figure 3:
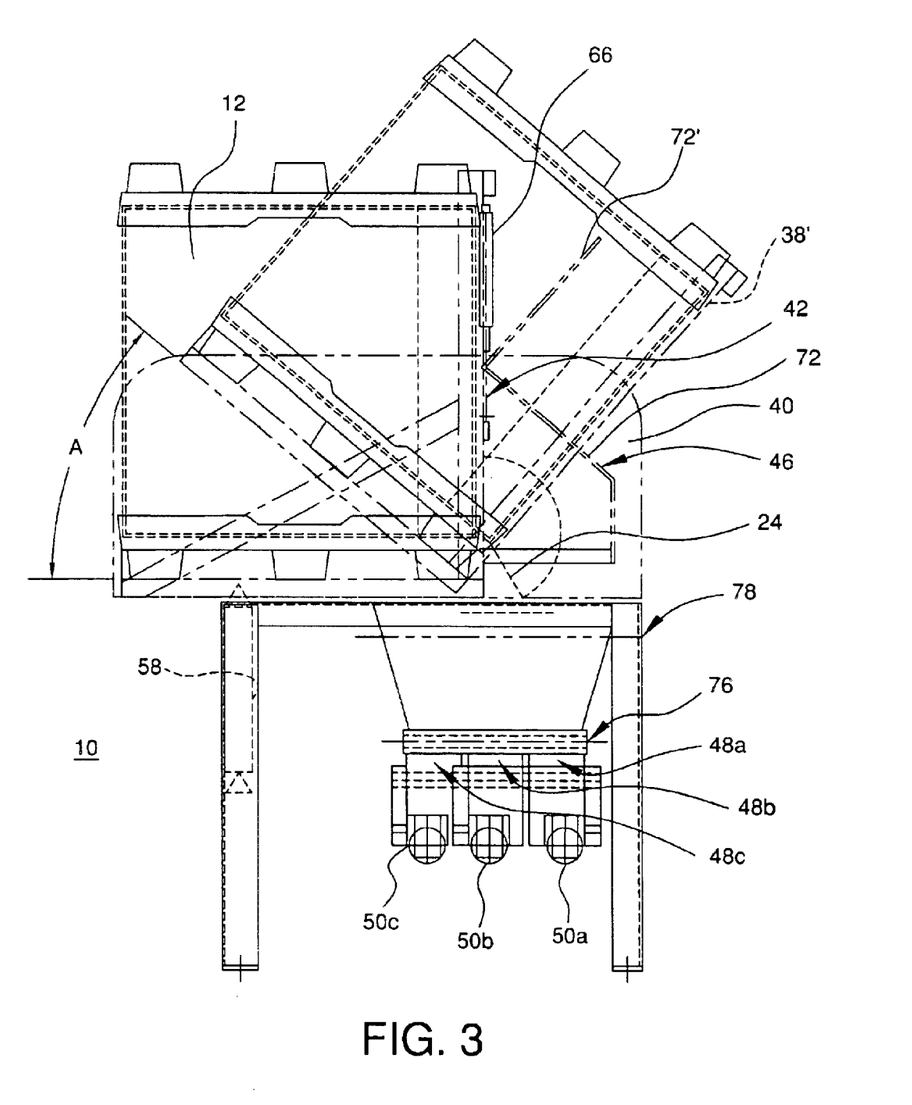
FIG. 3 is a side elevation view of the system embodiment shown in FIG. 1 showing additional conveyors.

Frame 38 is supported by structural supports 36, and includes frame rails 54 and a pivot 56. Frame 38 preferably is L-shaped, including a substantially horizontal rails for receiving bin bottom 30 thereon, and a substantially vertical rails for receiving bin front sidewall 18. The references horizontal and vertical as employed with respect to frame 38 are oriented based on frame 38 being in its lowered, or at rest position. In this regards, frame 18 is pivotable relative to supports 36 about pivot 56. FIGS. 1 through 3 illustrated frame 38 in its lower, at rest position, and shown its fully raised position in dashed lines as indicated by reference numeral 38'.

A portion of frame 38 through which closures may flow is defined for description purposes as a lower portion of the vertical frame rails 54, and corresponds to bin opening 20. It is understood that such definition is for description purposes only, as the vertical portion of frame 38 preferably is formed of an outer frame of structural rail members 54, such as standard channels or angles, that is approximately the size of, or slightly smaller than, front sidewall 18 of bin 12. The area within the vertical structural rails 54 preferably is open to enhance visual and hand access, and to minimize costs.

Figure 5:
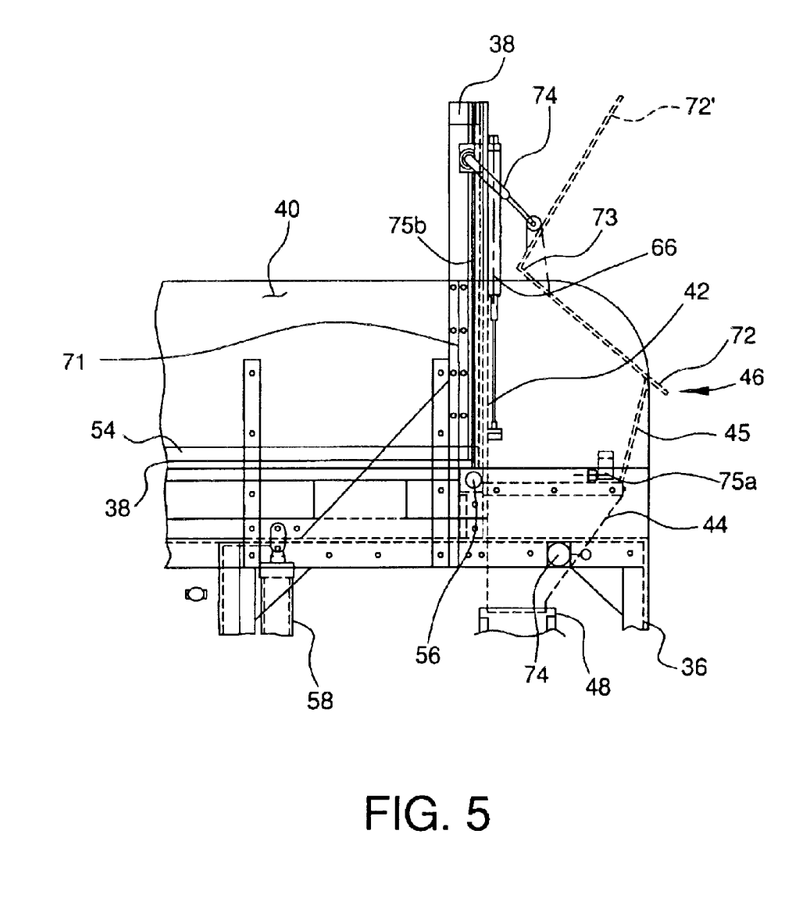
FIG. 5 is an enlarged view of a portion of the apparatus shown in FIG. 2.

As shown schematically in FIGS. 1 and 3 and as partially shown in FIG. 5, frame 38 is moved by an actuator 58, such as a pair of opposing pneumatic cylinders, including a first end coupled to supports 36 and an opposing second end affixed to frame 38. Actuator 58 preferably is configured to move frame 38 between its at-rest position through an angle A, shown in FIG. 3. For example, angle A is approximately 41 degrees for unloading a bin containing approximately 64,500 conventional closures from the bin as described in the U.S. Pat. No. 6,298,994.

Side barriers 40 extend upwardly from supports 36, or alternatively from frame 38 (the latter configuration is not shown), on opposing sides of bin 12. Thus, side barriers 40 receive bin 12 therebetween and restrict lateral movement of bin 12. Preferably, side barriers 40 are formed of clear safety glass, such as Lexan™ or the like, to enhance visual recognition of the position of frame 38.

As shown in FIGS. 1 and 2, and in more detail in FIG. 5, gate 42 is a slideable member that is moved up and down on frame 38 by an actuator, such as pneumatic cylinder 66. Thus, the moveable portion of gate 42 is a plate that is moveably secured to the vertical portion of frame 38 between an upper or gate-open position and a lower or gate-closed position. Gate 42 blocks the portion of frame 38 through which closures may flow while in the gate-closed position, and is spaced apart therefrom while in the gate-open position.

Actuator 66 has a first end that is affixed to the vertical portion of frame 38 and an opposing second end that is coupled to gate 42. Preferably, the closing force of actuator 66 is adjustable to prevent damage to individual closures while gate 42 is closed while closures are disposed in bin opening 20 and/or hopper 44, as explained more fully below. Because gate 42 is coupled to the vertical portion of rails 54, gate 42 pivots with frame 38 and therefore remains proximate bin opening 20 throughout the range of positions of frame 38.

Hopper 44 preferably is supported from supports 36 and does not pivot with frame 38. Hopper 44 is disposed below bin opening 20 throughout the range of positions of frame 38 during its pivoting, and receives closures flowing therefrom. Hopper 44 may be formed of sheet steel with portions, such as upper portion 45 (shown in FIG. 5), formed of a clear material to provide visual access. Preferably, a slide gate 48 is disposed at the bottom of hopper 44 to enable or prevent flow of closures therefrom. A conveyor (not shown in FIGS. 1, 2, or 5) may be disposed beneath slide gate 48, as will be understood by persons familiar with closure unloading systems.

As best shown in FIG. 5, access cover assembly 46 is disposed on the front end of apparatus 46 and essentially covers bin opening 20 and hopper 44 to inhibit dust infiltration therein in order to maintain cleanliness of the closures. Further, access cover assembly 46 prevents closures from falling or bouncing from hopper 44 during the unloading process. Access cover assembly 46 includes a pair of opposing pivotable access doors 70 and a top plate 72 therebetween.

Each access door 70 preferably has a vertical hinge 71 that enables side access to hopper 44 and bin opening 20. Top plate 72 preferably has a horizontal hinge 73. Top plate 72 is shown in FIG. 5 in its down, closed position. Its fully up, open position is indicated by reference numeral 72'. Preferably, a cylinder 74 is attached to a linkage on top plate 72 to hold top plate 72 in its up position. Access door 70 and top plate 72 may also include provisions for manually locking door 70 and top plate 72. For example, as shown schematically in FIG. 5, access door 70 and the linkage of top plate 72 may be lockable to frame 38 by locks 75a and 75b, respectively. Locking door 70 and top plate 72 may provide security to inhibit or prevent tampering with the closures.

Figure 8:
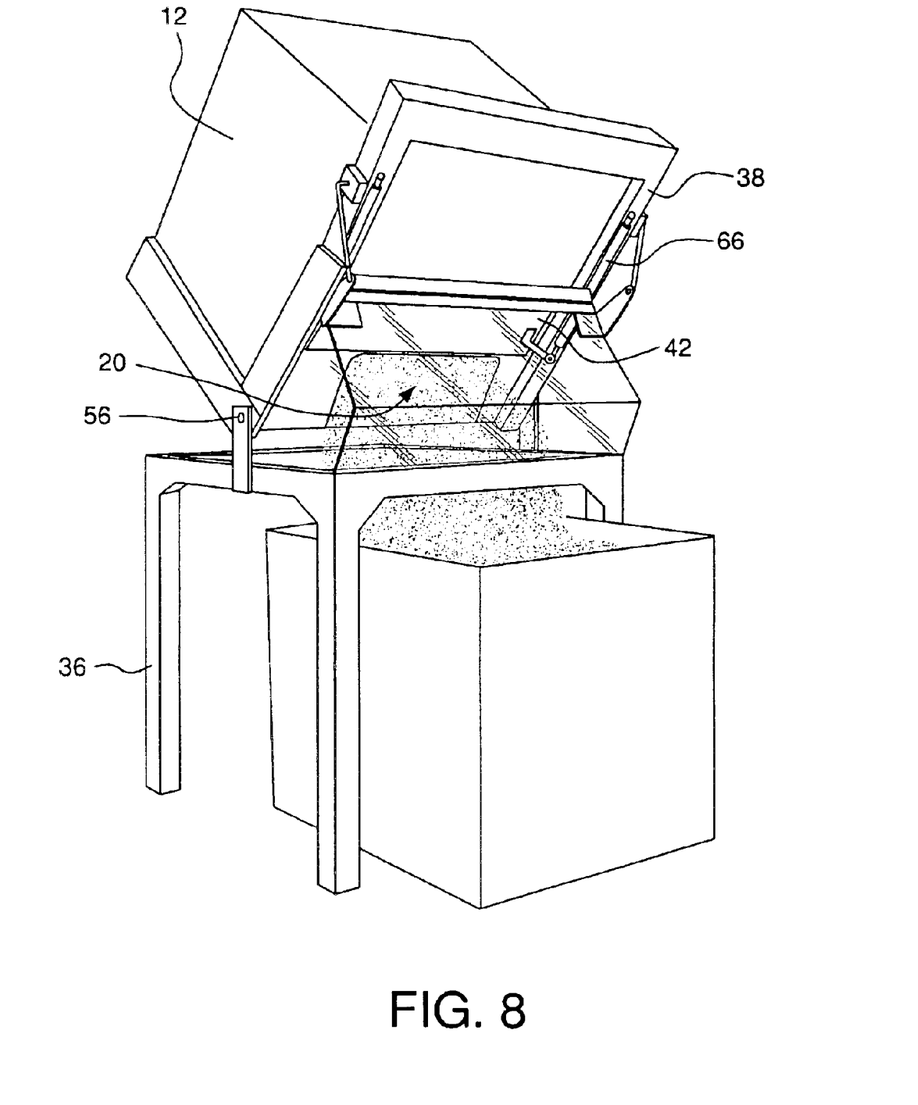
FIG. 8 is a perspective, diagrammatic view of the system shown in FIG. 1.

FIG. 8 diagrammatically illustrates system 10. For clarity some structure is omitted (for example hopper 44 barriers 40), and the closures are shown as a translucent mass.

Figure 4:
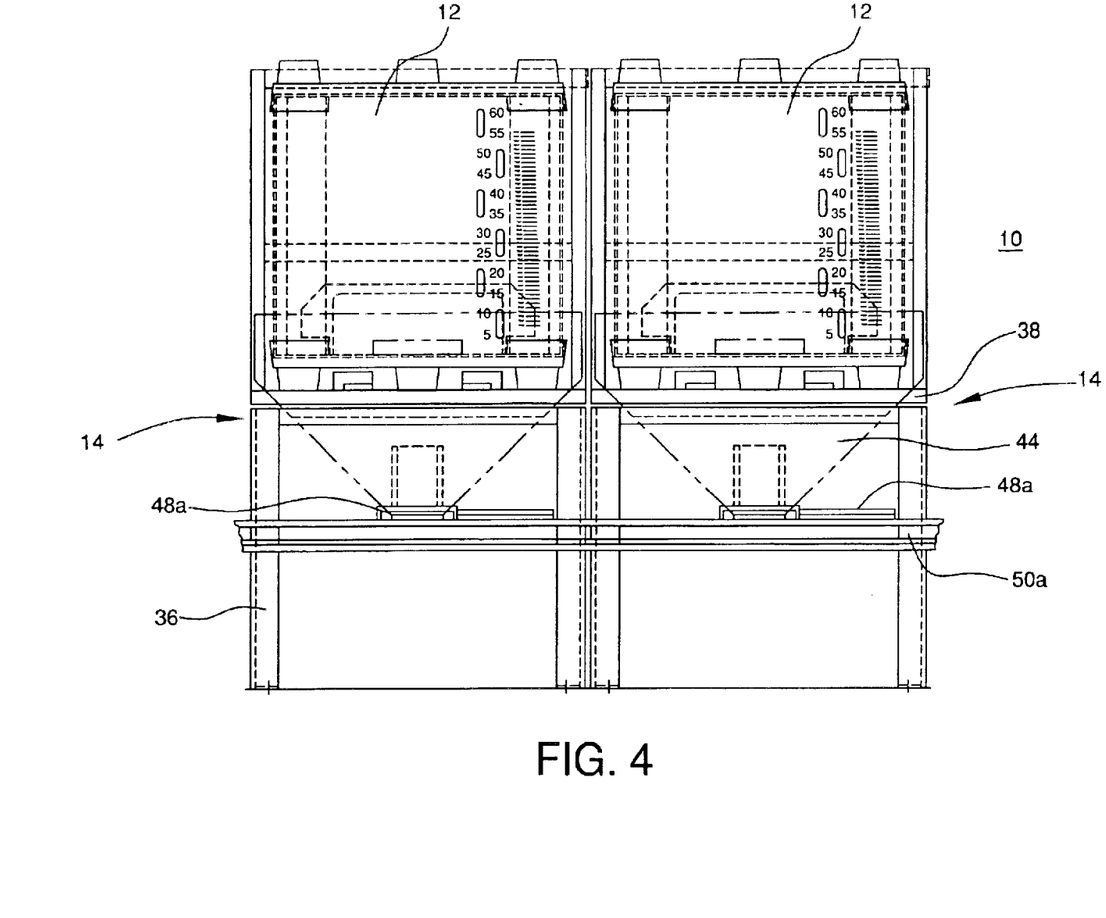
FIG. 4 is a front elevation view of the system embodiment shown in FIG. 1 showing multiple bulk disclosure dispensing systems.

As shown in FIGS. 3, 4, and 6, multiple bulk disclosure dispensing systems 10 may be employed to produce an effective closure unloading system. Multiple bins 12 may be positioned on adjoining apparatus 14 for quick change between closure types, uninterrupted flow of closures, and like benefits. To further enhance a system of multiple apparatus 14, plural conveyors, which are indicated by reference numerals 50a, 50b, and 50c in the Figures may be employed. Each conveyor 50a, 50b, and 50c may, have a respective slide gate, which slide gates are indicated by reference numerals 48a, 48b, and 48c. Thus, the arrangement of several bulk closure dispensing systems 10 provide for flexible and fast unloading of bins 10, as will be understood by persons familiar with conventional bin unloading technology.

As shown schematically in FIG. 2, and omitted from other Figures for clarity, apparatus 14 may also include an access shield 60 that extends downwardly from a distal end of frame 38 opposite pivot 56. As frame 38 pivots upward, shield 60, which is outwardly curved and continuous, prevents personnel access to the space between frame 38 and supports 36, thereby eliminating pinch points for personnel safety. Pins 64 are insertable through holes in supports 36 and shield 60 to lock shield 60 in its fully up or fully down position.

System 10 may include any controls that may be helpful to operation thereof. For example, a gate control 74 (as shown in FIG. 5) may be disposed near access cover assembly 46 to provide local control of gate 42 while providing visual access thereto. Another control may enable actuation of frame actuators 58 to pivot frame 38. A pair of photo eyes 76 and 78 (as shown in FIG. 5) may be disposed in hopper 44 and interlocked to control actuators 58 and gate 72. For example, an unbroken beam of upper photo eye 78 may result in actuation of actuators 58 toward the fully extended position such that bin 10 is tilted to a larger angle. An unbroken beam of lower photo eye 76 may indicate that hopper 44 is essentially empty.

To begin the unloading process, as well as the operation of system 10, a loaded bin 12 may be transported by forklift and lowered into position on frame rails 54 within side barriers 40. The forklift may dispose bin 12 such that the bin front sidewall is in contact the vertical frame rails. Such a position of the forklift is shown in dashed lines in FIG. 6. After unlocking locks 75*a* and 75*b* (if necessary), an operator may open one of the cover access doors 70 and move top cover 72 to its uppermost position 72' where it preferably is held by the corresponding air cylinder and linkage. Pins 64 may be disposed in corresponding holes to manually prevent frame 38 from pivoting. Other safety interlocks may be provided, as will be understood by persons familiar with safety interlocks of mechanical equipment.

A cord (not shown) or like feature may be disposed over flap 22 and hooked or secured into apertures 26 to secure flap 22 to sidewall 18. After removing the cord or like feature, the operator may reach into access cover assembly 46 and pivot flap 22 from its fully up, flap-closed position to its fully down, flap-open position to expose bin opening 20. Typically, closures are disposed in plastic bags within bins 12. Thus, for bins 12 that are not already partially unloaded, the operator may rip or cut open the plastic bag. Because gate 42 is at least partially up or open to provide operator access to bin opening 20, closures may begin to flow through bin opening 20 into hopper 44.

The operator may then close, and if desired lock, access door 70 and top plate 72. By controlling actuator 58, the operator may pivot frame 38 as necessary to cause closures to flow from bin 12 into hopper 44. During the operation of frame 38, top plate 72 may slide relative to the upper portion of hopper 44. Pneumatic cylinders are employed to illustrate actuators 58 and 66, although any conventional actuator may be employed according to the description herein, as will be understood by persons generally familiar with actuation of mechanical equipment.

If it is desired to empty all of the closures from the respective bin 12, then frame 28 may be maintained such that the bin bottom 30 provides a sufficiently steep incline for as long as required for conveyors 50*a*, 50*b*, and/or 50*c* to transport the closures and/or for hopper 44 to receive the closures. The angled portions 34 prevent closures from hanging up in the front corners of bin 12. In this regard, the present invention may employ hexagonal bins or like containers, or even containers including right angles between its front and sidewalls, such as a having a rectangular transverse cross section.

The present invention may also be employed to partially unload a bin, such as bin 12. Gate 42 may be employed to stop the flow of closures from bin 12 either during free flow of closures therethrough or while the closures are statically piled up in hopper 44 such that the space immediately in front of bin opening 20 is filled with closures. In this regard, the operator may move gate control 74 to urge gate 42 toward the closed position. The force by which gate 42 closes may be adjustable (or like measures employed) to prevent damage to closures.

Upon gate 42 being disposed in a position that blocks bin opening 20, which may be the gate's fully-closed position or near thereto, an operator may open access door 70 and/or top plate 72 and raise flap 22 such that gate 42 is disposed proximate bin opening 20, and flap 22 is disposed over gate 42. Gate 42 may then be raised such that it slides out from between bin opening 20 and flap 22 in such a way that flap 22 remains to cover bin opening 20. Flap 22 may be more urged to engage sidewall 18 surrounding bin opening 20. A cord, preferably an elastic cord such as a bungee, may be disposed over flap 22 and secured into opposing holes 26. The bin, partially unloaded in this manner, may be removed from apparatus 12 after lowering of frame 38 and replaced with another bin, according to the particular requirements of the capping process. The partially unloaded bin may be placed onto an apparatus 12, as desired, and prepared for unloading as described above, except that the plastic bag internal to bin 12 is already pierced for a partially unloaded bin.

An example of the benefit that the capability to partially unload a bin 12 is improved management of bins and closures. For example, if the capping process requires only a quantity of closures corresponding to a particular fraction of bin 12, apparatus 14 enables unloading or dispensing of only that particular fraction of bin 12. The openings in the sidewall of bin 12 enhances the ability to assess the quantity of closures remaining. Further, gates 50*a*, 50*b*, and/or 50*c* enable fast transfer from one bin to another in configurations in which more than one apparatus 14 is employed. Further, hopper 44 may include an access door to enhance removal of closures remaining therein.

Particular configurations of equipment have been described to illustrate aspects of the present invention. The present invention is not, however, limited to the particular embodiments disclosed herein, but rather encompasses any configuration and/or modification of components or features in accordance with the claims. For example, the present invention encompasses employing any type of bin having any type or shape of opening, and gates of any configuration or actuation means. Moreover, although the present invention relates to container closures, the term closures may encompass any conventional, bulky product that may be unloadable in the apparatus as described herein. Further, the present invention encompasses apparatus of any type or configuration of access cover assembly, hopper, or conveyor, and configuration which lack such features.

We claim:

1. A bulk closure dispensing system comprising:

a bin for housing plural closures, the bin including an opening formed in a lower portion thereof and a cover for moveably covering the bin opening;

a frame for receiving and tilting the bin, the frame including a fixed first portion, a second portion, and a pivot operatively coupling the first and second portions thereby enabling the second portion to pivot relative to the first portion;

a movable gate, supported by the frame, including a closed position in which the gate essentially covers the bin opening and an open position in which the gate is spaced apart from the opening to enable closures to flow therethrough, the gate being moveable from the open position to the closed position while closures are within the bin, thereby enabling dispensing of less than all of the closures from the bin.

2. The bulk closure system of claim 1 wherein the bin cover is a pivotable flap that is pivotable between a flap-closed position in which the flap substantially covers the bin opening and a flap-open position in which the flap is pivoted away from the bin opening to enable closures to flow therethrough.

3. The bulk closure system of claim 2 wherein the flap is secureable to a sidewall of the bin while in the flap-closed position.

4. The bulk closure system of claim 2 wherein a sidewall of the bin includes features for enabling a cord to be disposed over the flap while in its flap-closed position to secure the flap therein.

5. The bulk closure dispensing system of claim 1 wherein the gate is coupled to the frame and pivotable therewith.

6. The bulk closure dispensing system of claim 5 wherein the gate is slideable on the frame.

7. The bulk closure dispensing system of claim 6 wherein the gate includes actuators for moving the gate between the gate-open position and the gate-closed position.

8. The bulk closure dispensing system of claim 7 wherein a gate closing force provided by the actuator is adjustable.

9. The bulk closure dispensing system of claim 7 wherein the actuators are pneumatic cylinders.

10. The bulk closure dispensing system of claim 1 further comprising a hopper disposed below the bin to receive the closures.

11. The bulk closure dispensing system of claim 10 wherein the gate is moveable from the open position to the closed position while closures are flowing from the bin into the hopper, whereby the flow of closures is interrupted.

12. The bulk closure dispensing system of claim 10 wherein the gate is moveable from the open position to the closed position while closures are statically piled in the hopper such that the closures fill the bin opening.

13. The bulk closure dispensing system of claim 10 wherein said first portion is a support structure elevating the frame above a floor.

14. The bulk closure system of claim 13 further comprising an access shield coupled to an end of the frame opposite the pivot, the access shield movable with the frame and extending downwardly therefrom, the access shield preventing a pinch-point between the frame and the support structure.

15. The bulk closure system of claim 14 further comprising pins insertable through the support frame and through the access shield, thereby preventing movement of the frame relative to the support structure.

16. The bulk closure system of claim 10 further comprising an access cover disposed over the bin opening and an exposed portion of the hopper.

17. The bulk closure dispensing system of claim 16 wherein the access cover is coupled to the frame and pivotable thereon between a cover-open position enabling access to the hopper and a cover-closed position inhibits personnel access to the hopper.

18. The bulk closure dispensing system of claim 17 wherein the access cover in its cover-closed position inhibits dust infiltration into the hopper.

19. The bulk closure system of claim 17 wherein the access cover is lockable in its cover-closed position.

20. The bulk closure system of claim 1 wherein the cover is pivotably coupled to the bin.

21. A method of handling closures, comprising the steps of:
a. providing plural closures in a portable bin that has an opening in a sidewall thereof and a moveable cover substantially covering the bin opening while the cover is in a cover-closed position;
b. disposing the bin on a frame of a dispensing apparatus that includes a gate that is moveable between a closed position in which the gate essentially covers the bin opening and an open position in which the gate is spaced apart from the opening to enable closures to flow therethrough, the frame including a fixed first portion, a second portion, and a pivot operatively coupling the first and second portions thereby enabling the second portion to pivot relative to the first portion, the gate being moveable from the open position to the closed position while closures are within the bin; and
c. pivoting the second frame portion, thereby tilting the bin to encourage closures to flow outward from the bin through the bin opening into a hopper while the cover is in a cover-open position and the gate is in a gate-open position.

22. The method of claim 21 further comprising the step of actuating the gate to its gate-closed position while a portion of the closures are disposed in the bin, thereby preventing closures from further flowing from the bin.

23. The method of claim 22 further comprising the step of closing the cover while the gate is in its gate closed position.

24. The method of claim 23 wherein the cover includes a flap such that the step of closing the cover is pivoting the flap over the bin opening while the gate is in the gate-closed position.

25. The method of claim 24 wherein the step of closing the cover includes first moving the gate from the gate-open position to the gate-closed position while the flap is pivoted downward away from the bin opening, pivoting the flap over the gate in the gate-closed position, and retracting the gate to the gate-closed position, thereby leaving the flap covering the bin opening.

26. The method of claim 25 further comprising the step of securing the flap to the bin sidewall after the closing the cover step.

27. The method of claim 26 wherein the securing the flap step includes securing the flap with a cord that is inserted into a hole in the bin sidewall.

28. The method of claim 22 further comprising the step of opening the cover after the step of actuating the gate to the gate-closed position such that the portions of the bin may be unloaded in discontinuous stages.

29. The method of claim 21 wherein the cover is pivotally coupled to the bin.

30. The method of claim 29 wherein the gate is slideable between the open and closed position.

31. The method of claim 30 wherein the gate is slideable parallel to a plane defined by the bin opening.

32. The method of claim 31 wherein the gate is planar.

33. The method of claim 29 further comprising the step of closing the cover comprising (i) sliding the gate to at least near the gate-closed position, (ii) pivoting the cover to at least near the cover-closed position while the gate is at least near the gate-closed position, whereby the gate is disposed between the cover and the bin opening, and (iii) sliding the gate out from between the cover and the bin opening.

34. A bulk closure dispensing apparatus for unloading closures from a bin through an opening therein, the bin including a cover pivotally connected thereto for covering the opening, comprising:
- a frame for receiving and tilting the bin, the frame including a fixed first portion, a second portion, and a pivot operatively coupling the first and second portions thereby enabling the second portion to pivot relative to the first portion, the second portion including an open front portion which is capable of receiving closures therethrough;
- a gate coupled to the frame, the gate is slideable on the frame between a closed position and an open position, whereby the gate in the gate-closed position essentially covers the frame open front portion and the gate in the gate-open position is spaced apart from the frame open front portion to enable closures to flow therethrough, the gate being capable of sliding between the gate-open and the gate-closed position during any phase of the closure unloading process; and
- a hopper disposed below the gate.

35. The bulk closure dispensing apparatus of claim 34 wherein the gate includes actuators for moving the gate between the gate-open position and the gate-closed position.

36. The bulk closure dispensing apparatus of claim 35 wherein a gate closing force provided by the actuators is adjustable.

37. The bulk closure dispensing apparatus of claim 35 wherein the actuators are pneumatic cylinders.

38. The bulk closure system of claim 35 wherein the gate is slideable parallel to a plane formed by the bin opening.

39. The bulk closure system of claim 38 wherein the gate is planar.

40. The bulk closure system of claim 35 wherein the gate is capable of being disposed between the cover and the bin opening during the process of moving the gate from the closed position to the open position.

41. The bulk closure dispensing apparatus of claim 34 wherein the gate is capable of being disposed between the cover and the bin opening.

* * * * *